United States Patent
Nakaiso et al.

(10) Patent No.: US 10,424,440 B2
(45) Date of Patent: Sep. 24, 2019

(54) CAPACITOR HAVING AN AUXILIARY ELECTRODE

(71) Applicant: Murata Manufacturing Co., Ltd., Nagaokakyo-shi, Kyoto-fu (JP)

(72) Inventors: Toshiyuki Nakaiso, Nagaokakyo (JP); Takashi Komiyama, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 100 days.

(21) Appl. No.: 15/676,050

(22) Filed: Aug. 14, 2017

(65) Prior Publication Data

US 2017/0345577 A1  Nov. 30, 2017

Related U.S. Application Data

(63) Continuation of application No. PCT/JP2016/054638, filed on Feb. 18, 2016.

(30) Foreign Application Priority Data

Feb. 27, 2015  (JP) .................................. 2015-038013

(51) Int. Cl.
*H01G 4/33* (2006.01)
*H01G 4/005* (2006.01)
(Continued)

(52) U.S. Cl.
CPC ............ *H01G 4/33* (2013.01); *H01G 4/005* (2013.01); *H01G 4/008* (2013.01); *H01G 4/018* (2013.01); *H01G 4/232* (2013.01); *H01G 4/40* (2013.01)

(58) Field of Classification Search
CPC .......... H01G 4/33; H01G 4/005; H01G 4/008; H01G 4/40; H01G 4/232; H01G 4/018
See application file for complete search history.

(56) References Cited

U.S. PATENT DOCUMENTS

| 5,777,839 A | 7/1998 | Sameshima et al. |
| 6,066,537 A * | 5/2000 | Poh ................... H01L 23/5223 |
| | | 257/E21.008 |

(Continued)

FOREIGN PATENT DOCUMENTS

| JP | S60-158612 A | 8/1985 |
| JP | H05-47586 A | 2/1993 |

(Continued)

OTHER PUBLICATIONS

International Search Report issued in International Application No. PCT/JP2016/054638, dated May 10, 2016.

(Continued)

*Primary Examiner* — David M Sinclair
(74) *Attorney, Agent, or Firm* — Arent Fox LLP

(57) ABSTRACT

A capacitor that includes a lower common electrode having a first region and a second region, a first upper electrode opposing the first region, a first dielectric layer between the first region and the first upper electrode, a second upper electrode located in a layer in which the first upper electrode is located and opposing the second region, a second dielectric layer between the second region and the second upper electrode, a first connection electrode electrically connected to the first upper electrode, a second connection electrode located in a layer in which the first connection electrode is located and electrically connected to the second upper electrode, and auxiliary electrodes located in a layer different from a layer in which the lower common electrode is located and that connect the first region and the second region of the lower common electrode.

19 Claims, 14 Drawing Sheets

(51) Int. Cl.
   *H01G 4/008* (2006.01)
   *H01G 4/018* (2006.01)
   *H01G 4/232* (2006.01)
   *H01G 4/40* (2006.01)

(56) References Cited

U.S. PATENT DOCUMENTS

| | | | |
|---|---|---|---|
| 7,092,232 B2 * | 8/2006 | Yamagata | H01G 5/38 |
| | | | 361/272 |
| 7,348,624 B2 * | 3/2008 | Sakaguchi | H01L 23/5223 |
| | | | 257/296 |
| 7,403,370 B2 | 7/2008 | Oi et al. | |
| 9,728,340 B2 | 8/2017 | Ishii et al. | |
| 2004/0164819 A1 * | 8/2004 | Mishima | H01G 4/33 |
| | | | 333/174 |
| 2006/0197184 A1 | 9/2006 | Oi et al. | |
| 2006/0245139 A1 * | 11/2006 | Kariya | H01G 4/232 |
| | | | 361/272 |
| 2008/0186654 A1 * | 8/2008 | Takeshinna | H01G 4/232 |
| | | | 361/313 |
| 2013/0038981 A1 * | 2/2013 | Imanaka | H01G 4/1227 |
| | | | 361/301.4 |
| 2013/0328735 A1 | 12/2013 | Ishii et al. | |
| 2014/0139968 A1 * | 5/2014 | Ikenaga | H01G 7/06 |
| | | | 361/281 |
| 2014/0225793 A1 * | 8/2014 | Ikemoto | H04B 5/0062 |
| | | | 343/748 |
| 2016/0142105 A1 * | 5/2016 | Ikenaga | H04B 1/18 |
| | | | 455/41.1 |

FOREIGN PATENT DOCUMENTS

| | | | | |
|---|---|---|---|---|
| JP | H05-135999 A | 6/1993 | | |
| JP | 2006-185935 A | 7/2006 | | |
| JP | 2006-210589 A | 8/2006 | | |
| JP | 2010-21234 A | 1/2010 | | |
| JP | 2012-15326 A | 1/2012 | | |
| JP | 2013-258224 A | 12/2013 | | |
| WO | WO-2013061985 A1 * | 5/2013 | | H04B 5/0062 |
| WO | WO 2013/183472 A1 | 12/2013 | | |

OTHER PUBLICATIONS

Written Opinion of the International Searching Authority issued in International Application No. PCT/JP2016/054638, dated May 10, 2016.

* cited by examiner

FIG. 15 – PRIOR ART

CAPACITOR HAVING AN AUXILIARY ELECTRODE

CROSS REFERENCE TO RELATED APPLICATIONS

The present application is a continuation of International application No. PCT/JP2016/054638, filed Feb. 18, 2016, which claims priority to Japanese Patent Application No. 2015-038013, filed Feb. 27, 2015, the entire contents of each of which are incorporated herein by reference.

FIELD OF THE INVENTION

The present invention relates to capacitors to be embedded into electronic devices and, in particular, relates to a capacitor suitable for a low equivalent series resistance (ESR).

BACKGROUND OF THE INVENTION

A thin-film capacitor of which a dielectric layer and internal electrodes sandwiching the dielectric layer are formed through a thin-film process is typically small in size and has a low equivalent series inductance (ESL). Thus, such a capacitor is used in a filter in a high-frequency circuit or used in a matching circuit.

A conventional thin-film capacitor has a structure in which a $(Ba_xSr_{1-x})TiO_3$ film (hereinafter, referred to as a BST film) having a high dielectric constant is sandwiched by an upper electrode and a lower electrode, as indicated in Patent Document 1, for example.

A BST film is fired at a high temperature of approximately no lower than 800° C. nor higher than 1000° C. in an oxidizing atmosphere. Thus, a platinum (Pt) thin film formed through sputtering is used for an internal electrode. Although tungsten (W) also meets the firing condition described above, tungsten has a low electrical conductivity and is thus not suitable from the viewpoint of low ESR performance.

Patent Document 1: Japanese Unexamined Patent Application Publication No. 2010-21234

SUMMARY OF THE INVENTION

A thin-film capacitor, while being very small in size, can be used as a large-capacitance chip capacitor. However, the ESR (equivalent series resistance) of the thin-film capacitor can act as a large factor in the characteristics of the Q-factor or the insertion loss of a filter circuit, for example. As described above, Pt thin films are used as the upper electrode and the lower electrode in the thin-film capacitor, and thus low ESR performance cannot be obtained due to the low electrical conductivity of these electrodes.

Now, an example of the orientation of the current flowing in the lower electrode is illustrated in FIG. 15. In FIG. 15, a lower common electrode 40 is formed on a substrate 10. A first upper electrode and a second upper electrode are disposed on an upper portion of the lower common electrode 40. A first region Z1 is a region that the first upper electrode opposes, and a second region Z2 is a region that the second upper electrode opposes. The arrows illustrated in FIG. 15 indicate exemplary paths of the current that flows from the first region Z1 to the second region Z2. The current concentrates on a portion at which the first region Z1 and the second region Z2 oppose each other within a plane, but the current paths are also distributed toward the outer side portion of the first region and the second region Z2. In particular, the current also concentrates on the edge portions on both sides of the lower common electrode 40 in the longitudinal direction. Therefore, a sheet resistance in the in-plane direction of the lower common electrode 40 is important.

The present invention is directed to providing a capacitor that is more effective in reducing the ESR by improving the shape and the disposition of a conductor portion.

A capacitor according to an embodiment of the present invention includes a first lower electrode; a second lower electrode; a first upper electrode opposing the first lower electrode; a first dielectric layer between the first lower electrode and the first upper electrode; a second upper electrode opposing the second lower electrode; a second dielectric layer between the second lower electrode and the second upper electrode; a first connection electrode electrically connected to the first upper electrode; a second connection electrode electrically connected to the second upper electrode and located in a first layer in which the first connection electrode is located; an auxiliary electrode located in a second layer different from the first layer in which the first lower electrode and the second lower electrode are located; a first interlayer connection conductor interposed between and electrically connecting the first lower electrode to the auxiliary electrode; and a second interlayer connection conductor interposed between and electrically connecting the second lower electrode to the auxiliary electrode.

With the configuration described above, the auxiliary electrode is connected in parallel to the first lower electrode and the second lower electrode, and thus the effective sheet resistance of the first and second lower electrodes and the auxiliary electrode is reduced. Accordingly, the ESR is reduced.

It is preferable that the auxiliary electrode have a sheet resistance that is lower than sheet resistances of the first lower electrode and the second lower electrode. With this configuration, the resistance value of the parallel connection circuit formed by the lower common electrode and the auxiliary electrode is reduced effectively even when the auxiliary electrode is relatively small, and thus an increase in the size of the device can be prevented.

It is also preferable that a primary portion of the auxiliary electrode be provided in the layer in which the first connection electrode and the second connection electrode are provided. With this configuration, the capacitor can be constituted without providing a layer for forming the auxiliary electrode in particular, and an increase in the size and in the cost can be prevented.

Preferably, the auxiliary electrode is connected to each of the first lower electrode and the second lower electrode at a plurality of locations. With this configuration, the number of bypass paths of the current from the first lower electrode and the second lower electrode to the auxiliary electrode increases, and the effect of reducing the ESR is enhanced.

It is further preferable that the auxiliary electrode is connected to the first lower electrode and the second lower electrode through openings provided in the first upper electrode and the second upper electrode. With this configuration, the path length from the first lower electrode and the second lower electrode to a primary current path of the auxiliary electrode can be reduced, and the effect of reducing the ESR is enhanced.

The auxiliary electrode is preferably disposed along outer side portions of the first connection electrode and the second connection electrode when viewed in plan view of the capacitor. With this configuration, the current that tends to flow so as to concentrate on the edge portions of the first lower electrode and the second lower electrode due to the edge effect bypasses effectively to the auxiliary electrode, and thus the effect of reducing the ESR is enhanced even with an auxiliary conductor having a small area.

It is also preferable that the first lower electrode and the second lower electrode comprise a metal containing Pt as a primary component thereof, and that the first connection electrode, the second connection electrode, and the auxiliary electrode comprise a metal containing Cu or Al as a primary component thereof. With this configuration, the first and second lower electrodes and the first and second upper electrodes, which are the electrodes that sandwich the dielectric layers, can be formed of electrode materials suitable therefor, and the ESR can also be reduced.

It is also preferable that a substrate that supports the first lower electrode, the second lower electrode, the first upper electrode, the second upper electrode, the first connection electrode, the second connection electrode, the auxiliary electrode, the first dielectric layer, and the second dielectric layer be provided, that the first lower electrode, the second lower electrode, the first upper electrode, the second upper electrode, the first connection electrode, the second connection electrode, and the auxiliary electrode be metal thin films formed through a thin-film process, and that the first dielectric layer and the second dielectric layer be dielectric thin films formed through a thin-film process. With this configuration, a small-sized and large-capacitance capacitor can be obtained.

Preferably, the first lower electrode and the second lower electrode are continuous in the same layer. With this configuration, the number of layers necessary for the lower electrodes is reduced, the pattern is simplified, the size is reduced, and the ease of manufacturing increases.

In further preferred configurations, the first lower electrode and the second lower electrode are isolated from each other. The first lower electrode and the second lower electrode are electrically connected with the auxiliary electrode interposed therebetween.

The first dielectric layer and the second dielectric layer are preferably ferroelectric layers such that a capacitance between the first lower electrode and the first upper electrode changes in accordance with a voltage applied across the first lower electrode and the first upper electrode, and a capacitance between the second lower electrode and the second upper electrode changes in accordance with a voltage applied across the second lower electrode and the second upper electrode. With this configuration, a capacitor serving as a low ESR variable capacitance element is constituted.

It is also preferable that a control voltage applying circuit that includes a plurality of resistance elements having different resistance values and configured to apply a control voltage having a plurality of varying patterns across the first lower electrode and the first upper electrode and across the second lower electrode and the second upper electrode be provided. With this configuration, a capacitor serving as a variable capacitance element of which the capacitance value is controlled by an externally applied control voltage is constituted.

According to the present invention, an auxiliary electrode is connected in parallel to a lower electrode in which a large amount of current flows in an in-plane direction, and the resistance component in the current path is reduced; thus, a low ESR capacitor can be obtained.

BRIEF DESCRIPTION OF THE DRAWINGS

FIG. 15 illustrates an example of the orientation of the current flowing in a lower common electrode in a conventional capacitor.

DETAILED DESCRIPTION OF PREFERRED EMBODIMENTS

Figure 1:
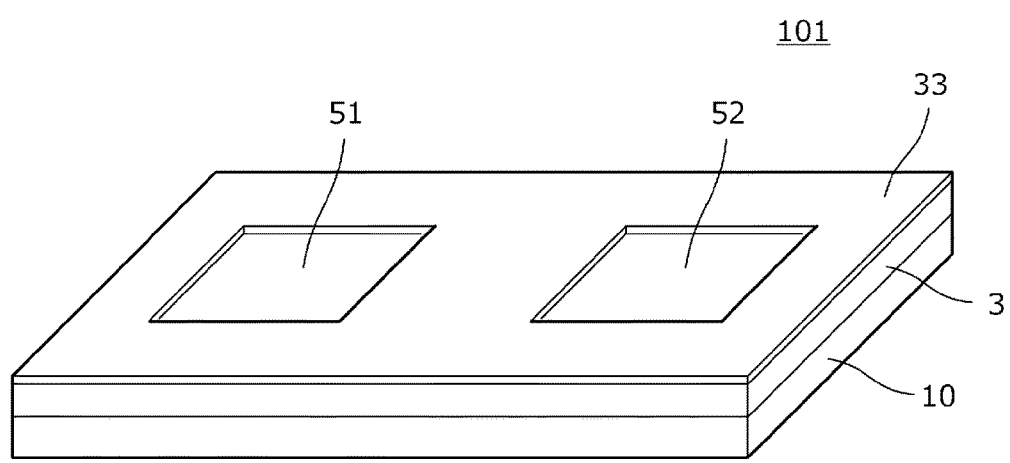
FIG. 1 is a perspective view of a capacitor 101 according to a first embodiment.

Hereinafter, a plurality of embodiments for implementing the present invention will be illustrated by way of some specific examples with reference to the drawings. In the drawings, identical portions are given identical reference characters. In second and subsequent embodiments, descriptions of features that are common to those of a first embodiment will be omitted, and the differences will be described. In particular, similar effects obtained through similar configurations will not be noted one by one in every embodiment.

«First Embodiment»

Figure 2:
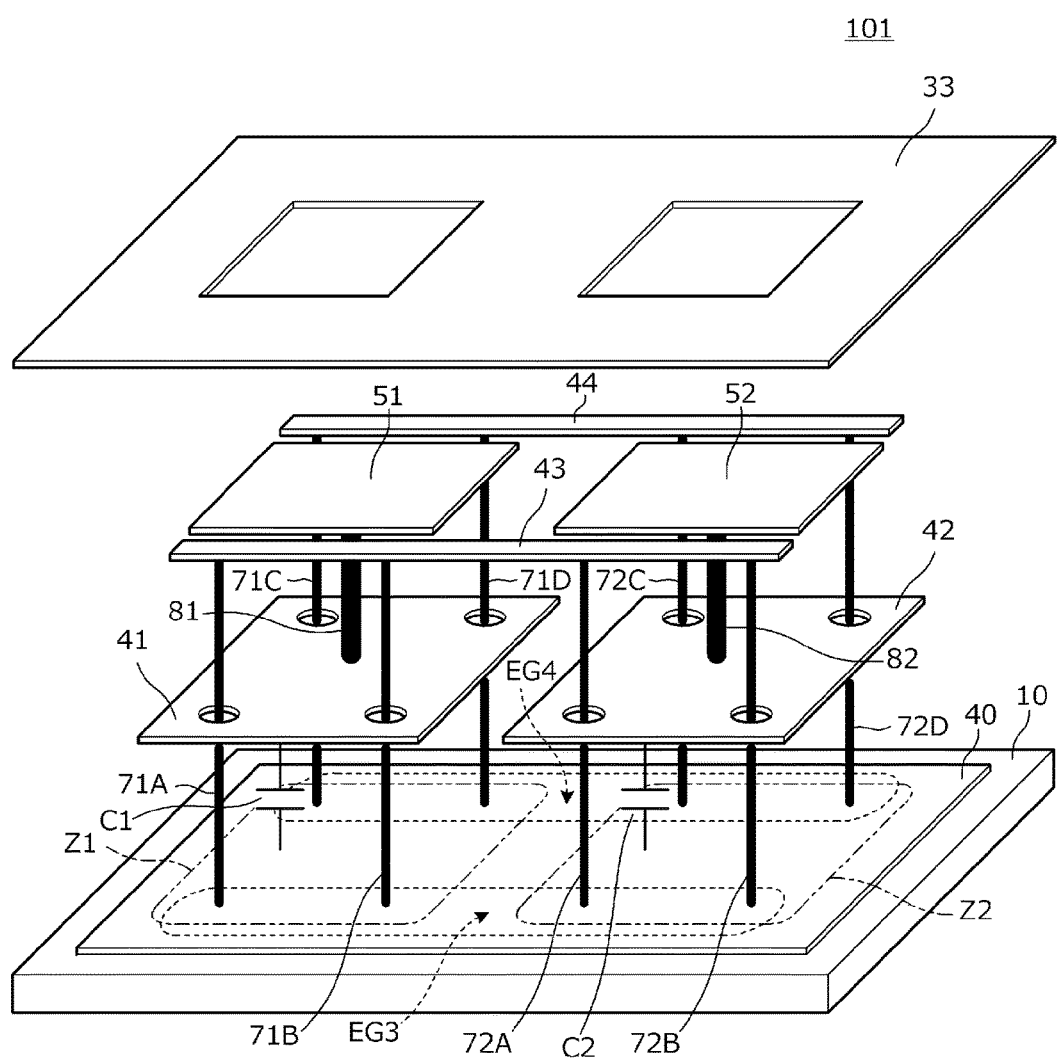
FIG. 2 is a schematic exploded perspective view of the capacitor 101.
Figure 3:
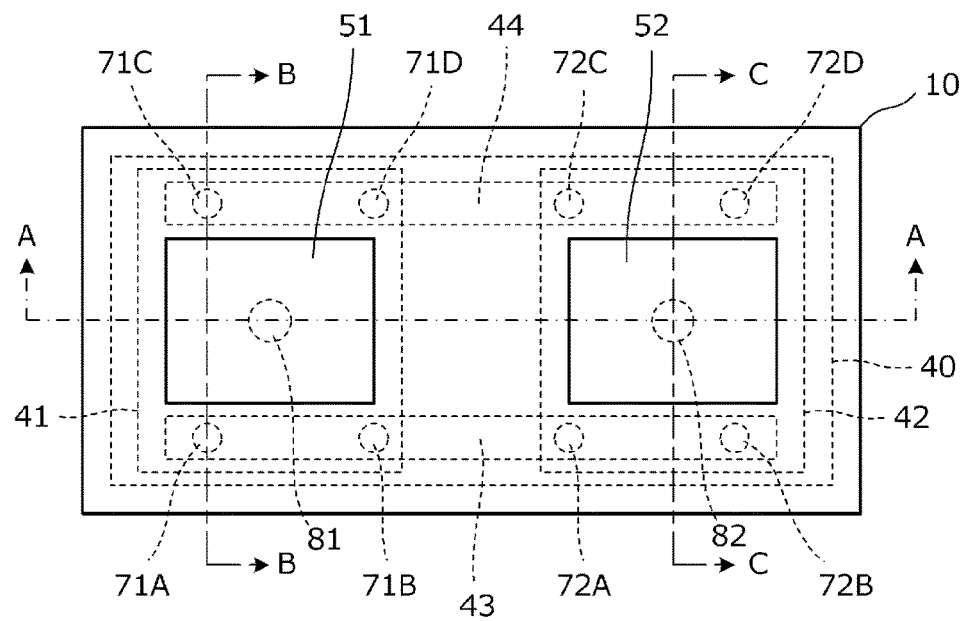
FIG. 3 is a plan view of the capacitor 101.
Figure 4A:
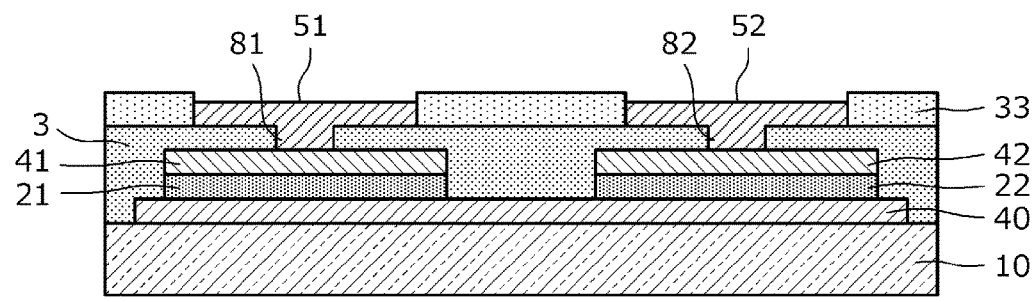
FIG. 4(A) is a sectional view taken along the A-A portion illustrated in FIG. 3.
Figure 4B:
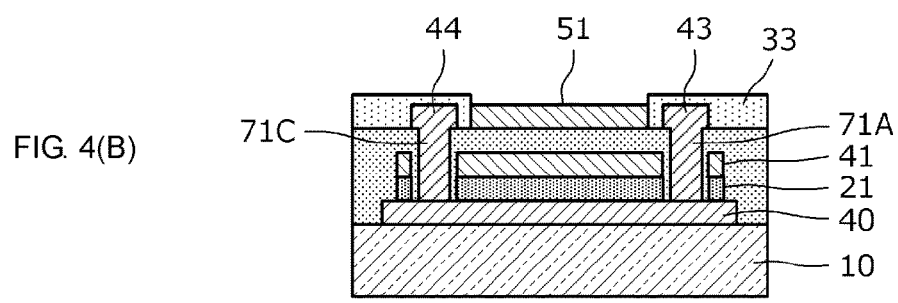
FIG. 4(B) is a sectional view taken along the B-B portion illustrated in FIG. 3.
Figure 4C:
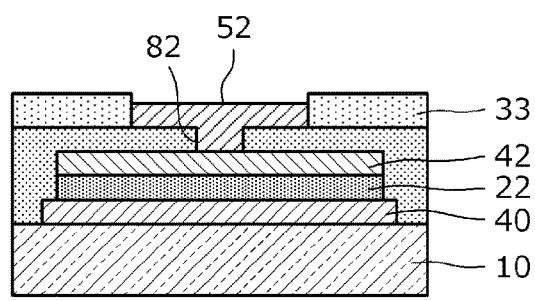
FIG. 4(C) is a sectional view taken along the C-C portion illustrated in FIG. 3.

FIG. 1 is a perspective view of a capacitor 101 according to a first embodiment. FIG. 2 is a schematic exploded perspective view of the capacitor 101. FIG. 3 is a plan view of the capacitor 101. FIG. 4(A) is a sectional view taken along the A-A portion illustrated in FIG. 3. FIG. 4(B) is a sectional view taken along the B-B portion illustrated in FIG. 3. FIG. 4(C) is a sectional view taken along the C-C portion illustrated in FIG. 3.

The capacitor 101 includes a mounting surface, which corresponds to the upper surface as illustrated in FIG. 1, and is surface-mounted onto a circuit board.

The capacitor 101 includes the elements listed below.

(a) a lower common electrode 40 having a first region Z1 and a second region Z2, (b) a first upper electrode 41 that is disposed so as to oppose the first region Z1, (c) a first dielectric layer 21 that is disposed between the first region Z1 and the first upper electrode 41, (d) a second upper electrode 42 that is provided in a layer in which the first upper electrode 41 is provided and that is disposed so as to oppose the second region Z2, (e) a second dielectric layer 22 that is disposed between the second region Z2 and the second upper electrode 42, (f) a first connection electrode 51 that is connected to the first upper electrode 41, (g) a second connection electrode 52 that is provided in a layer in which the first connection electrode 51 is provided and that is connected to the second upper electrode 42, and (h) auxiliary electrodes 43 and 44 that are provided in a layer different from a layer in which the lower common electrode 40 is provided and that connect the first region Z1 of the lower common electrode 40 and the second region Z2 of the lower common electrode 40.

The first region Z1 is a region of the lower common electrode 40 that the first upper electrode 41 opposes, and the second region Z2 is a region of the lower common electrode 40 that the second upper electrode 42 opposes. The first region Z1 of the lower common electrode 40 corresponds to a "first lower electrode" according to the present invention, and the second region Z2 of the lower common electrode 40 corresponds to a "second lower electrode" according to the present invention.

A first capacitor portion is constituted by the first region Z1 of the lower common electrode 40, the first upper electrode 41, and the first dielectric layer 21. In a similar manner, a second capacitor portion is constituted by the second region Z2 of the lower common electrode 40, the second upper electrode 42, and the second dielectric layer 22. In FIG. 2, the first capacitor portion is represented by a capacitor C1, and the second capacitor portion is represented by a capacitor C2.

The first upper electrode 41 is connected to the first connection electrode 51 with an interlayer connection conductor 81 interposed therebetween. In a similar manner, the second upper electrode 42 is connected to the second connection electrode 52 with an interlayer connection conductor 82 interposed therebetween. This provides a configuration in which a series circuit of the first capacitor portion (the capacitor C1) and the second capacitor portion (the capacitor C2) is connected between the first connection electrode 51 and the second connection electrode 52. The first connection electrode 51 and the second connection electrode 52 are connected, for example, to respective mounting electrodes formed on the surface of the circuit board with an electrically conductive bonding material interposed therebetween.

The lower common electrode 40 is formed on a first principal surface of a substrate 10. The peripheries of the first capacitor portion and the second capacitor portion are sealed by an insulation layer 3. A protective layer 33 that exposes the first connection electrode 51 and the second connection electrode 52 and that covers the remaining area is formed on the upper surface of the insulation layer 3 through a solder resist or the like.

The auxiliary electrodes 43 and 44 are provided in a layer above the layer in which the lower common electrode 40 is provided and are provided, in the present example, in the layer in which the first connection electrode 51 and the second connection electrode 52 are provided.

As illustrated in FIG. 2 and FIG. 4(B), the auxiliary electrodes 43 and 44 are connected to the lower common electrode 40 through openings provided in the first upper electrode 41 and the second upper electrode 42. In other words, each of the auxiliary electrodes is connected to the lower common electrode with a plurality of interlayer connection conductors interposed therebetween.

In addition, as illustrated in FIG. 2 and FIG. 3, the auxiliary electrodes 43 and 44 are disposed in an outer side portion of the regions in which the first connection electrode 51 and the second connection electrode 52 are formed as viewed from the above. The auxiliary electrodes 43 and 44 each have an elongated pattern that extends in the direction in which the first upper electrode 41 and the second upper electrode 42 are arrayed. To rephrase, the auxiliary electrodes 43 and 44 each have a belt-shaped pattern that extends along the current path, which will be described later. The lengthwise dimension of the auxiliary electrodes 43 and 44 is substantially equal to the lengthwise dimension of the lower common electrode 40. In addition, the auxiliary electrodes 43 and 44 are disposed symmetrically with respect to an imaginary line connecting the center of the first upper electrode 41 with the center of the second upper electrode 42.

As illustrated in FIG. 2 and FIG. 3, the auxiliary electrodes 43 and 44 are connected to the first region Z1 of the lower common electrode 40 with interlayer connection conductors 71A, 71B, 71C, and 71D interposed therebetween. In a similar manner, the auxiliary electrodes 43 and 44 are connected to the second region Z2 of the lower common electrode 40 with interlayer connection conductors 72A, 72B, 72C, and 72D interposed therebetween.

The substrate 10 is a Si substrate having an insulation film formed on the surface thereof. The lower common electrode 40, the first upper electrode 41, and the second upper electrode 42 are each a Pt thin film. The first dielectric layer 21 and the second dielectric layer 22 are BST thin films. The auxiliary electrodes 43 and 44, the interlayer connection conductors 71A, 71B, 71C, 71D, 72A, 72B, 72C, and 72D, the first connection electrode 51, and the second connection electrode 52 are all Cu thin films. These may instead be Al thin films.

The current flows into and out of the capacitor 101 through the first connection electrode 51 and the second connection electrode 52. If the auxiliary electrodes 43 and 44 are not present, for example, when the current flows in through the first connection electrode 51 and flows out through the second connection electrode 52, the current flows only through the following path: the first connection electrode 51→the interlayer connection conductor 81→the first upper electrode 41→the first dielectric layer 21→the lower common electrode 40→the second dielectric layer 22→the second upper electrode 42→the interlayer connection conductor 82→the second connection electrode 52.

The capacitor 101 according to the present embodiment includes the auxiliary electrodes 43 and 44 and the interlayer connection conductors 71A, 71B, 71C, 71D, 72A, 72B, 72C, and 72D, and thus two current paths are produced. When the current flows in through the first connection electrode 51 and flows out through the second connection electrode 52, the current paths are as follows.

[Current Path 1]

The first connection electrode 51→the interlayer connection conductor 81→the first upper electrode 41→the first dielectric layer 21→the lower common electrode 40→the second dielectric layer 22→the second upper electrode 42→the interlayer connection conductor 82→the second connection electrode 52.

[Current Path 2]

The first connection electrode 51→the interlayer connection conductor 81→the first upper electrode 41→the first dielectric layer 21→the lower common electrode 40→the interlayer connection conductors 71A, 71B, 71C, and 71D→the auxiliary electrodes 43 and 44→the interlayer connection conductors 72A, 72B, 72C, and 72D→the lower common electrode 40→the second dielectric layer 22→the second upper electrode 42→the interlayer connection conductor 82→the second connection electrode 52.

In other words, a bypass current path constituted by the interlayer connection conductors 71A, 71B, 71C, 71D, 72A, 72B, 72C, and 72D and the auxiliary electrodes 43 and 44 is connected in parallel to the lower common electrode 40.

The auxiliary electrodes 43 and 44 are Cu thin films, whereas the lower common electrode 40 is a Pt thin film. Therefore, the auxiliary electrodes 43 and 44 have a lower sheet resistance (surface resistivity) than the lower common electrode 40. In order to make the resistance value of the auxiliary electrodes 43 and 44 even smaller, the thickness of the auxiliary electrodes 43 and 44 may be made greater than the thickness of the lower common electrode 40. In addition, the resistance value of the interlayer connection conductors 71A, 71B, 71C, 71D, 72A, 72B, 72C, and 72D in the direction of the current path is lower than or equal to the resistance value of the auxiliary electrodes 43 and 44 in the direction of the current path. Therefore, the current that flows in the current path 2 (bypass current) is greater than or equal to the current in the current path 1.

The first dielectric layer 21 and the second dielectric layer 22 may be isolated as illustrated in FIG. 4(A) or may be a single continuous dielectric layer.

Figure 5:
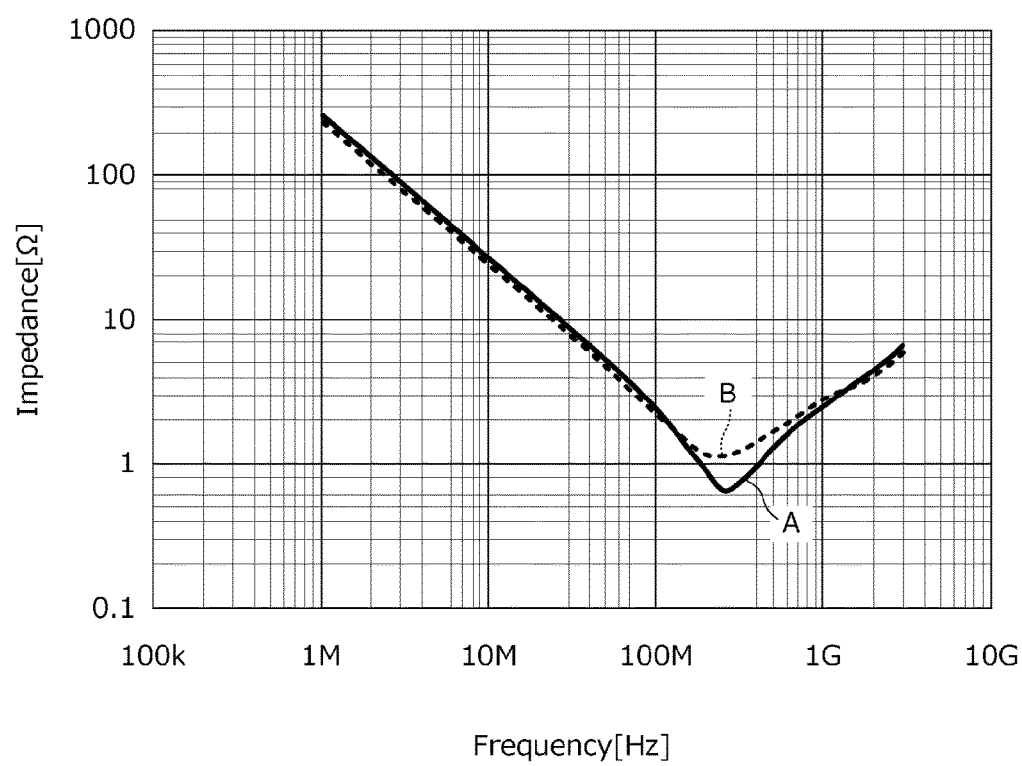
FIG. 5 illustrates the frequency characteristics of an impedance of the capacitor 101.
Figure 6:
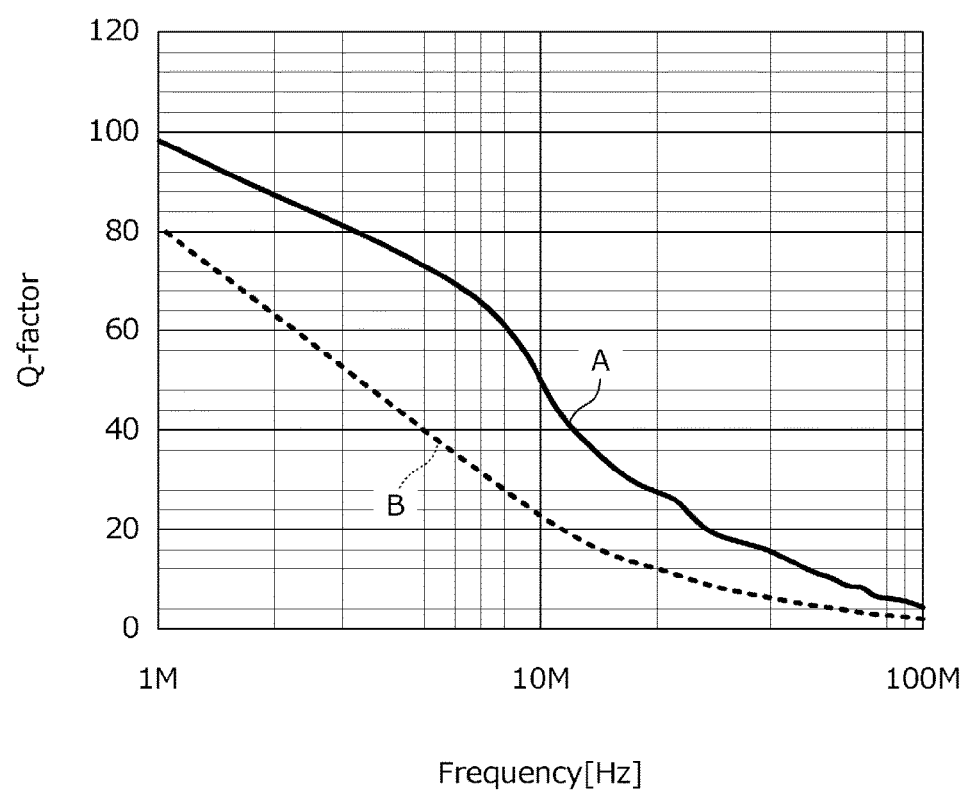
FIG. 6 illustrates the frequency characteristics of a Q-factor of the capacitor 101.

FIG. 5 illustrates the frequency characteristics of an impedance of the capacitor 101. FIG. 6 illustrates the frequency characteristics of a Q-factor of the capacitor 101. In FIG. 5 and FIG. 6, the characteristics curves A indicate the characteristics of the capacitor 101, and the characteristics curves B indicates the characteristics of a comparative example. The comparative example is a capacitor having a structure that does not include the auxiliary electrodes 43 and 44.

As illustrated in FIG. 5, with the capacitor 101 according to the present embodiment, the impedance is lowest at a frequency of approximately 250 MHz. The impedance at this frequency corresponds to the ESR, and the ESR is approximately 0.7 Ω. The ESR of the comparative example is approximately 1.1 Ω, which indicates that the ESR is improved by approximately 0.4 Ω as compared to the comparative example.

In addition, the Q-factor is calculated through (imaginary part of impedance)/(real part of impedance), and the Q-factor is approximately equal to $1/(\omega C \cdot (ESR+dielectric loss of dielectric))$ at a lower frequency side than the self-resonant frequency. Therefore, as illustrated in FIG. 6, although the Q-factor decreases as the frequency increases both in the embodiment and in the comparative example, as compared with the comparative example, the Q-factor is improved by 16 or more in the capacitor 101 according to the present embodiment in a range from 1 MHz to 11 MHz along with a decrease in the ESR.

Figure 14:
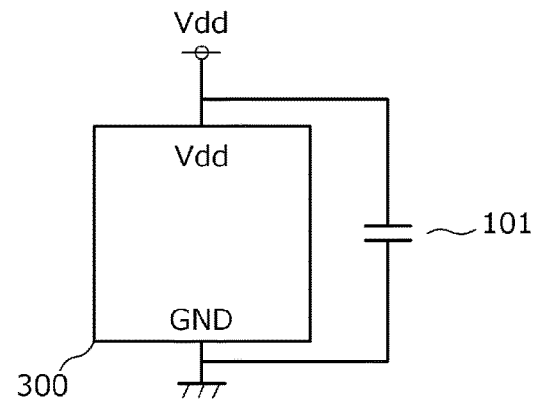
FIG. 14 illustrates a connection example of the capacitor 101 with respect to an application circuit.
Figure 14:
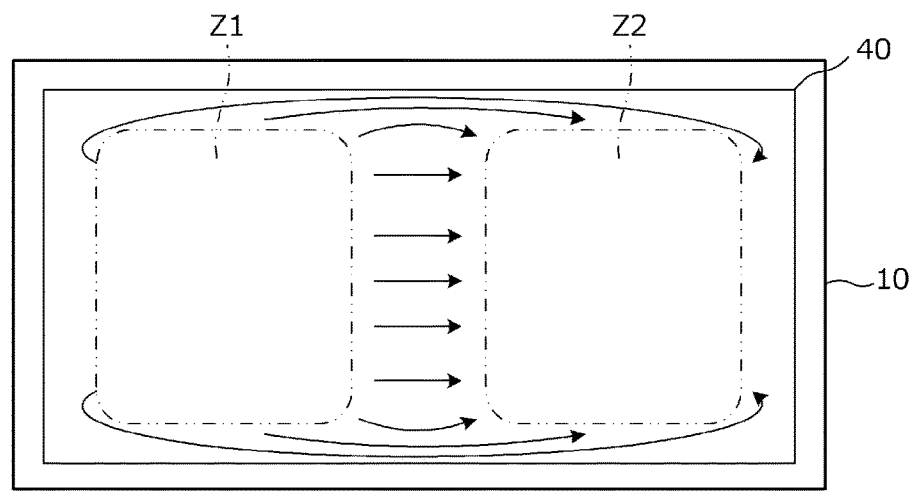

A capacitor according to the present invention (the capacitor 101 according to the present embodiment) is used, for example, as a decoupling capacitor (bypass capacitor) connected to the vicinity of a power-supply terminal Vdd and a ground terminal GND of a semiconductor integrated circuit 300, as illustrated in FIG. 14.

According to the present embodiment, such features as those indicated below are provided.

(a) The auxiliary electrodes 43 and 44 have a lower sheet resistance than the lower common electrode 40. Thus, even when the auxiliary electrodes 43 and 44 are relatively small, the resistance value of the parallel connection circuit of the lower common electrode 40 and the auxiliary electrodes 43 and 44 is reduced effectively. Therefore, an increase in the size of the device (capacitor) can be prevented.

(b) Primary portions of the auxiliary electrodes 43 and 44 are provided in the layer in which the first connection electrode 51 and the second connection electrode 52 are provided. Thus, the capacitor can be constituted without providing a layer for forming an auxiliary electrode in particular, and an increase in the size and in the cost can be prevented.

(c) Each of the auxiliary electrodes 43 and 44 is connected to the first region Z1 and the second region Z2 of the lower common electrode 40 at a plurality of portions. Thus, a large number of bypass paths for the current from the lower common electrode 40 to the auxiliary electrodes 43 and 44 are provided, and the effect of reducing the ESR is high.

(d) The auxiliary electrodes 43 and 44 are connected to the lower common electrode 40 through the openings provided in the first upper electrode 41 and the second upper electrode 42. Thus, the path length from the lower common electrode 40 to the primary current path of the auxiliary electrodes 43 and 44 can be reduced, and the effect of reducing the ESR is high.

(e) The auxiliary electrodes 43 and 44 are disposed in an outer side portion of the region in which the first connection electrode 51 and the second connection electrode 52 are formed as viewed from the above. Thus, the current that tends to flow so as to concentrate on the edge portions (edge portions EG3 and EG4 illustrated in FIG. 2) of the lower common electrode 40 due to the edge effect bypasses effectively to the auxiliary electrodes 43 and 44. Therefore, the effect of reducing the ESR is high even with the auxiliary electrodes 43 and 44 having small areas.

(f) The lower common electrode 40 is a metal containing Pt as a primary component; and the first connection electrode 51, the second connection electrode 52, and the auxiliary electrodes 43 and 44 are a metal containing Cu or Al as a primary component. Thus, the ESR can be reduced while suitable electrode materials are used for the lower common electrode and the first and second upper electrodes, which are the electrodes that sandwich the dielectric layers 21 and 22.

(g) The lower common electrode 40, the first upper electrode 41, the second upper electrode 42, the first connection electrode 51, the second connection electrode 52, and the auxiliary electrodes 43 and 44 are metal thin films formed through a thin-film process; and the first dielectric layer 21 and the second dielectric layer 22 are dielectric thin films formed through a thin-film process. Thus, a small-sized and large-capacitance capacitor can be obtained.

(h) The first upper electrode 41 and the second upper electrode 42 are formed in the same layer. Thus, the first upper electrode 41 and the second upper electrode 42 are formed through the same process, of the same material, and to the same thickness. Therefore, the first capacitor portion and the second capacitor portion can be made to have the same characteristics with ease.

The surfaces of the first connection electrode 51 and the second connection electrode 52 may be plated with Cu plating films or may further be plated with Ni/Au plating films.

Although an example in which the first connection electrode 51 is connected directly to the first upper electrode 41 with the interlayer connection conductor 81 interposed therebetween has been illustrated in the present embodiment, the first connection electrode 51 may instead be connected to the first upper electrode 41 with another element such as a capacitor element interposed therebetween (i.e., may be connected indirectly). The same applies to the relationship between the second upper electrode 42 and the second connection electrode 52, and the second connection electrode 52 may be connected indirectly to the second upper electrode 42. That an upper electrode and a connection electrode may be connected indirectly with another element interposed therebetween in this manner also applies to each of the embodiments described hereinafter.

«Second Embodiment»

In a second embodiment, a capacitor of which the configuration of lower electrodes differs from that of the example illustrated in the first embodiment will be illustrated.

Figure 7:
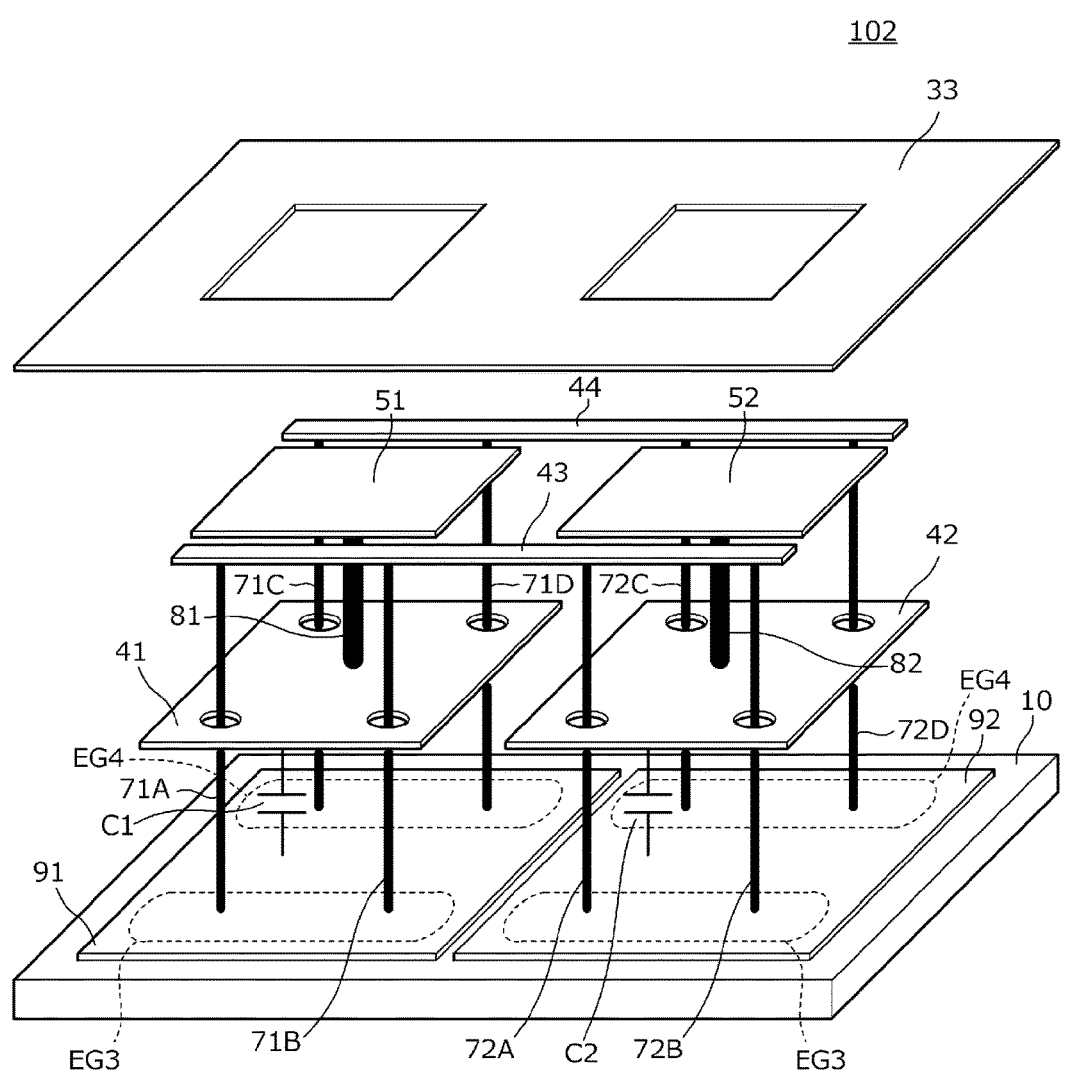
FIG. 7 is a schematic exploded perspective view of a capacitor 102 according to a second embodiment.
Figure 8A:
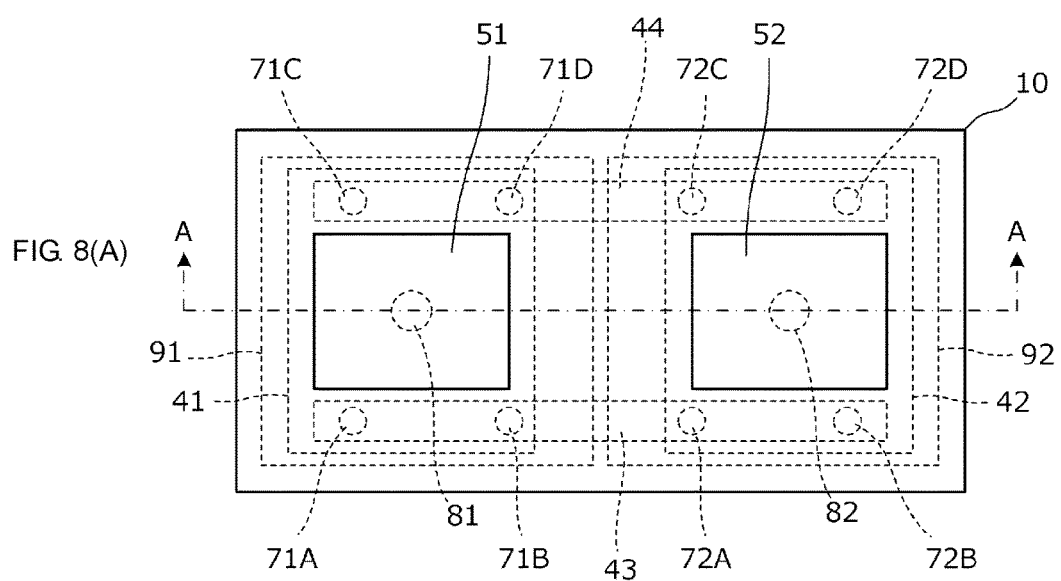
FIG. 8(A) is a plan view of the capacitor 102.
Figure 8B:
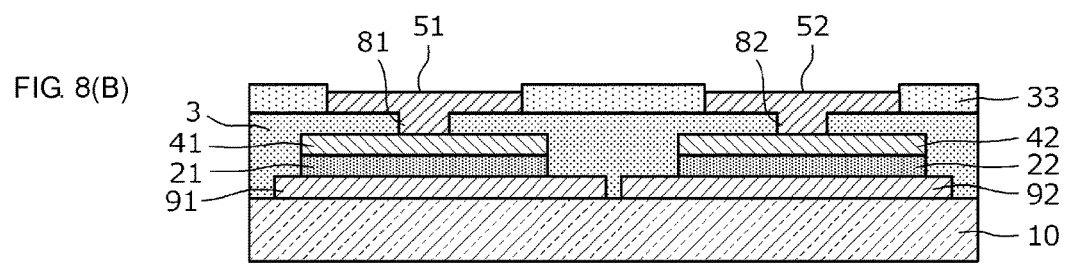
FIG. 8(B) is a sectional view taken along the A-A portion illustrated in FIG. 8(A).

FIG. 7 is a schematic exploded perspective view of a capacitor 102 according to the second embodiment. FIG. 8(A) is a plan view of the capacitor 102. FIG. 8(B) is a sectional view taken along the A-A portion illustrated in FIG. 8(A).

The capacitor 102 includes the elements listed below.

(a) a first lower electrode 91 and a second lower electrode 92, (b) a first upper electrode 41 that is disposed so as to oppose the first lower electrode 91, (c) a first dielectric layer 21 that is disposed between the first lower electrode 91 and the first upper electrode 41, (d) a second upper electrode 42 that is provided in a layer in which the first upper electrode 41 is provided and that is disposed so as to oppose the second lower electrode 92, (e) a second dielectric layer 22 that is disposed between the second lower electrode 92 and the second upper electrode 42, (f) a first connection electrode 51 that is connected to the first upper electrode 41, (g) a second connection electrode 52 that is provided in a layer in which the first connection electrode 51 is provided and that is connected to the second upper electrode 42, and (h) auxiliary electrodes 43 and 44 that are provided in a layer different from a layer in which the first lower electrode 91 and the second lower electrode 92 are provided and that connect the first lower electrode 91 and the second lower electrode 92.

The capacitor 102 differs from the capacitor 101 illustrated in FIG. 2 in the first embodiment in that the first lower electrode 91 and the second lower electrode 92 are provided in place of the lower common electrode 40. Other basic configurations are the same as those of the capacitor 101.

A first capacitor portion is constituted by the first lower electrode 91, the first upper electrode 41, and the first dielectric layer 21. In a similar manner, a second capacitor portion is constituted by the second lower electrode 92, the second upper electrode 42, and the second dielectric layer 22. In FIG. 7, the first capacitor portion is represented by a capacitor C1, and the second capacitor portion is represented by a capacitor C2.

The first lower electrode 91 is connected to the auxiliary electrodes 43 and 44 with interlayer connection conductors 71A, 71B, 71C, and 71D interposed therebetween. In a similar manner, the second lower electrode 92 is connected to the auxiliary electrodes 43 and 44 with interlayer connection conductors 72A, 72B, 72C, and 72D interposed therebetween. Thus, the first lower electrode 91 and the second lower electrode 92 are electrically connected to each other.

As in the present embodiment, the first lower electrode 91 and the second lower electrode 92 may be isolated from each other. In addition, the first lower electrode 91 and the second lower electrode 92 may be formed in different layers.

Dividing the lower electrode into the first lower electrode 91 and the second lower electrode 92 as in the present embodiment is disadvantage in terms of the effect of reducing the ESR as compared to the case in which the lower electrodes are constituted by a lower common electrode, but the areas of the first lower electrode 91 and the second lower electrode 92 can be reduced. Thus, curving or distortion associated with shrinkage of the electrode material at the time of manufacture can be reduced.

The first lower electrode 91 and the second lower electrode 92 are formed in the same layer, and thus the first lower electrode 91 and the second lower electrode 92 are formed through the same process, of the same material, and to the same thickness. Therefore, the first capacitor portion and the second capacitor portion can be made to have the same characteristics with ease.

«Third Embodiment»

In a third embodiment, an example in which the interlayer connection structure that connects auxiliary electrodes and a lower common electrode in the lamination direction differs from that of the first embodiment will be illustrated.

Figure 9:
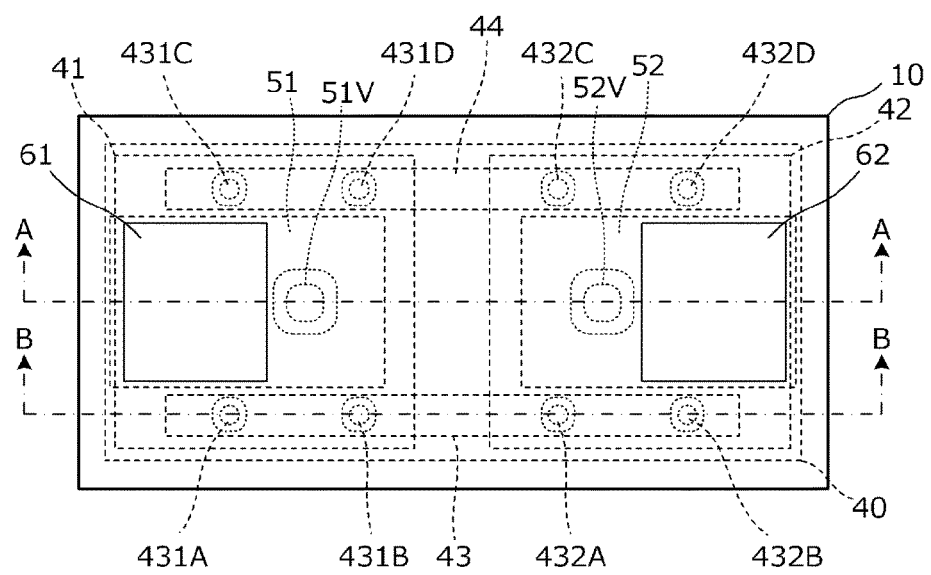
FIG. 9 is a plan view of a capacitor 103 according to a third embodiment.
Figure 10A:
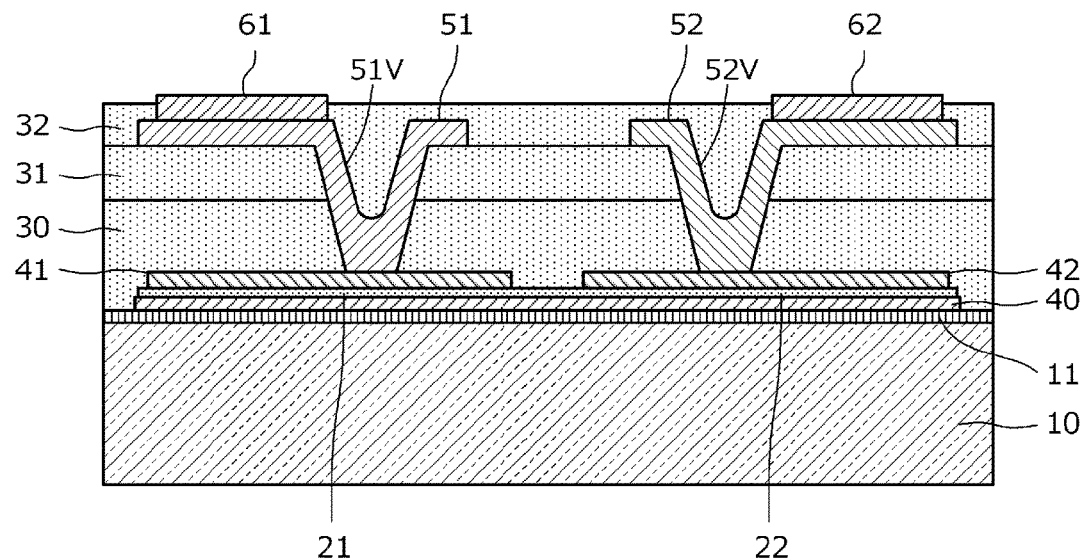
FIG. 10(A) is a sectional view taken along the A-A portion illustrated in FIG. 9.
Figure 10B:
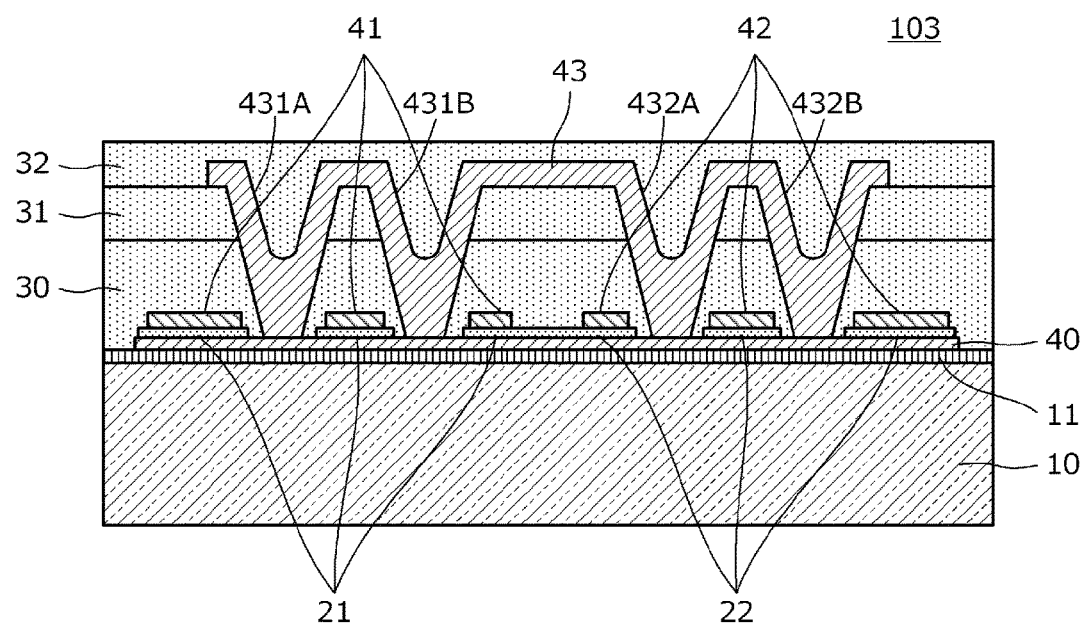
FIG. 10(B) is a sectional view taken along the B-B portion illustrated in FIG. 9.

FIG. 9 is a plan view of a capacitor 103 according to a third embodiment. FIG. 10(A) is a sectional view taken along the A-A portion illustrated in FIG. 9. FIG. 10(B) is a sectional view taken along the B-B portion illustrated in FIG. 9.

As illustrated in FIG. 10(A), a first connection electrode 51 has an interlayer connection portion 51V that extends downward and is connected to a first upper electrode 41. In a similar manner, a second connection electrode 52 has an interlayer connection portion 52V that extends downward and is connected to a second upper electrode 42.

In addition, as illustrated in FIG. 10(B), an auxiliary electrode 43 has interlayer connection portions 431A, 431B, 432A, and 432B that extend downward and are connected to a lower common electrode 40. In a similar manner, an auxiliary electrode 44 has interlayer connection portions 431C, 431D, 432C, and 432D, which are illustrated in FIG. 9, that extend downward and are connected to the lower common electrode 40.

The configurations of a first capacitor portion and a second capacitor portion are similar to those in the capacitor 101 illustrated in the first embodiment. However, a first dielectric layer 21 and a second dielectric layer 22 are constituted by an integrated (continuous) dielectric layer in the capacitor 103.

Hereinafter, the method of manufacturing the capacitor 103 will be described in sequence with reference FIGS. 10(A) and 10(B).

A substrate 10 is a semiconductor substrate or an insulator substrate and is representatively a Si substrate having a $SiO_2$ film and a SiN insulation film formed on the surface. A $(Ba_xSr_{1-x})TiO_3$ film (BST film) is formed on the substrate 10 to serve as a close contact layer 11.

On the surface of the close contact layer 11 (BST film), sequentially, a Pt electrode film is formed to serve as the lower common electrode 40, a BST film is formed to serve as the dielectric layers 21 and 22, and Pt electrode films are formed to serve as the first upper electrode 41 and the second upper electrode 42.

For example, the BST film is formed through a spin coating process and a firing process, and the Pt electrode films are formed through sputtering. The close contact layer 11 may be a film other than a BST film as long as a given film functions as a close contact layer for improving the close contact property of the electrode film with a $SiO_2$ insulation film. In addition, the close contact layer 11 is not necessarily essential. To form the electrode films described above, another noble metal material that has good electrical conductivity, that excels in the oxidation resistance, and that has a high melting point, such as Au, can also be used.

A $SiO_2$ film is formed through CVD or sputtering to serve as an inorganic insulation layer 30, and the inorganic insulation layer 30 is coated with a PBO (polybenzoxazole) film by an automatic coater or the like, which is then fired. Thus, a PBO film is formed to serve as a first organic protection layer 31. Then, an opening that is to serve as a contact hole is formed in the PBO film, for example, through inductively coupled plasma reactive ion etching (ICP-RIE). It is to be noted that the inorganic insulation layer is not limited to $SiO_2$, and the first organic protection layer is not limited to a PBO film, either.

A Ti/Cu/Ti film of 0.1 µm/1.0 µm/0.1 µm, for example, is formed inside the opening and on the surface of the PBO film through sputtering or the like.

The Ti/Cu/Ti film is patterned, and thus the first connection electrode 51, the second connection electrode 52, and the auxiliary electrodes 43 and 44 are formed. It is to be noted that each intermediate electrode is not limited to the Ti/Cu/Ti film formed through sputtering, and a Cu film or the like formed, for example, through plating may also be used.

A solder resist film is applied and formed to serve as a second organic protection layer 32.

Openings are formed in the solder resist film, the inside of the openings is subjected to Ni plating and then Au plating, and thus a first terminal electrode 61 and a second terminal electrode 62 of which the surfaces are Ni/Au plated are formed. It is to be noted that the plating films are not limited to Ni/Au, and a plating film of Ni/Sn or the like may instead be used.

In this manner, the capacitor according to the present embodiment is a thin-film capacitor for which a thin-film process is used. In this thin-film capacitor, when the first upper electrode 41, the second upper electrode 42, and so on are formed of a metal having a high melting point containing Pt as a primary component, BST, which is a material having a high dielectric constant, serving as the dielectric layers 21 and 22 can be fired at a high temperature of no lower than 800° C. nor higher than 1000° C. in an oxidizing atmosphere.

When the auxiliary electrode 43 and 44 are formed of a material having a small specific resistance, such as a metal film containing Cu as a primary component and are formed to have a large film thickness, the sheet resistance of the auxiliary electrodes 43 and 44 can be made smaller than the sheet resistance of the lower common electrode 40 (Pt). The auxiliary electrode 43 and 44 may also be formed of a metal containing, aside from Cu, Al as a primary component. With this configuration, a capacitor with a low ESR can be achieved while using suitable electrode materials for the first upper electrode 41, the second upper electrode 42, and the lower common electrode 40, which are the electrodes that sandwich the dielectric layers 21 and 22.

In the present embodiment, the first terminal electrode 61 and the second terminal electrode 62 formed of Cu or formed by metal films having Ni/Au plating films on the Cu surface are formed on the first connection electrode 51 and the second connection electrode 52. Thus, the electrical conductivity of the terminal electrodes is high, and the environmental resistance is high.

Cu plating films may be formed on the upper surfaces of the auxiliary electrodes 43 and 44, and Ni/Au plating films may further be formed on the surfaces of the Cu plating films. With this configuration, the sheet resistance of the auxiliary electrodes 43 and 44 can be further reduced.

Although an example in which the continuous close contact layer 11 is formed as a base for the lower common electrode 40 has been illustrated in the present embodiment, when the lower electrode is divided into a first lower electrode and a second lower electrode, a close contact layer serving as a base for the first lower electrode and a close contact layer serving as a base for the second lower electrode may be separated from each other.

Although the first terminal electrode 61 formed on the surface of the first connection electrode 51 and the second terminal electrode 62 formed on the surface of the second connection electrode 52 are used as the electrodes for external connection as illustrated in FIG. 10(A) in the present embodiment, the first connection electrode 51 and the second connection electrode 52 may instead be used as the electrodes for external connection without providing the first terminal electrode 61 and the second terminal electrode 62.

In addition the electrode for external connection does not need to project from the outermost surface layer (the second organic protection layer 32 in the present embodiment) and may lie in the same plane as the outermost surface layer (the second organic protection layer 32). Alternatively, the stated electrode may be recessed from the outermost surface layer (the protection layer 33), as illustrated in FIGS. 4(A), 4(B), and 4(C) in the first embodiment.

«Fourth Embodiment»

In a fourth embodiment, an example of a variable capacitance element of which the capacitance value is determined in accordance with a control voltage will be illustrated.

Figure 11A:
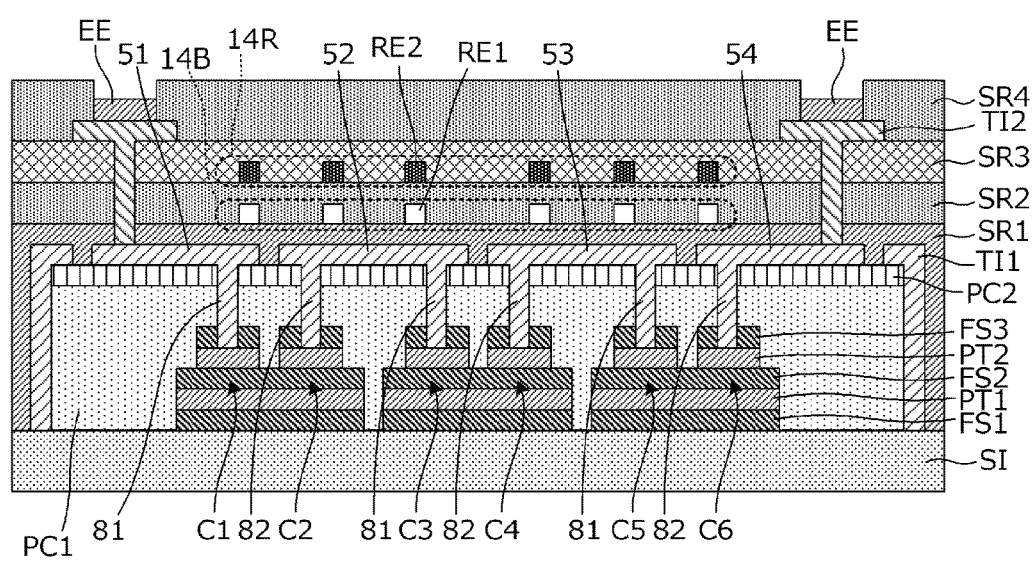
FIG. 11(A) is a sectional view of a primary portion of a capacitor 104A according to a fourth embodiment, and FIG. 11(B) s a fragmentary plan view of a primary portion of the capacitor 104A.
Figure 11B:
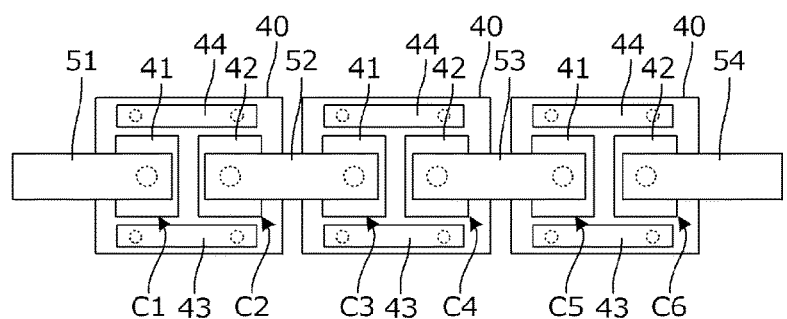

FIG. 11(A) is a sectional view of a primary portion of a capacitor 104A serving as a variable capacitance element. FIG. 11(B) is a fragmentary plan view of the inside of the capacitor 104A. It is to be noted that FIG. 11(B) illustrates a state that excludes a moisture-resistant protection film PC1, which will be described later.

In FIGS. 11(A) and 11(B), a substrate SI is a Si substrate having a $SiO_2$ film formed on the surface thereof. On this substrate SI, ferroelectric films and Pt films are formed in an alternating manner in the order of a ferroelectric film FS1, a capacitor electrode PT1, a ferroelectric film FS2, a capacitor electrode PT2, and a ferroelectric film FS3 to constitute a capacitor portion.

The upper portion of the laminated films of the ferroelectric films FS1, FS2, and FS3 and the capacitor electrodes PT1 and PT2 is covered by the moisture-resistant protection film PC1. An organic protection film PC2 is further formed on the upper portion of the moisture-resistant protection film PC1.

A wiring film TI1 is formed on the upper portion of the organic protection film PC2. In addition, first connection electrodes 51 and 53, second connection electrodes 52 and 54, and auxiliary electrodes 43 and 44 are formed by the wiring film TI1. These connection electrodes 51 to 54 are connected to predetermined portions of the capacitor electrode PT2 with contact holes interposed therebetween. In addition, the auxiliary electrodes 43 and 44 are connected to predetermined portions of the capacitor electrode PT1 with contact holes interposed therebetween. The wiring film TI1 is formed so as to cover the peripheries of the moisture-resistant protection film PC1 and the organic protection film PC2.

A first upper electrode 41 and a second upper electrode 42 illustrated in FIG. 11(B) are constituted by the capacitor electrode PT2 described above. In addition, a lower common electrode 40 is constituted by the capacitor electrode PT1 described above.

An interlayer insulation film SR1 is formed on the surface of the wiring film TI1. A resistance film pattern RE1 is formed on the surface of the interlayer insulation film SR1. The surface of the resistance film pattern RE1 is covered by an interlayer insulation film SR2, and a resistance film pattern RE2 is formed on the surface of the interlayer insulation film SR2. The surface of the resistance film pattern RE2 is covered by an interlayer insulation film SR3.

The resistance films of these resistance film patterns RE1 and RE2 are formed through a thin-film process (a process that uses photolithography and an etching technique) or a thick-film process (a process that uses a printing technique such as screen printing). The resistance value of each resistance element is determined in accordance with the width, the length, and the thickness of the resistance film pattern.

A wiring film TI2 is formed on the surface of the interlayer insulation film SR3. In addition, the wiring film TI2 is connected to the wiring film TI1 with the contact holes formed in the interlayer insulation films SR1, SR2, and SR3 interposed therebetween.

The surface of the interlayer insulation film SR3 is covered by a solder resist film SR4. An external connection electrode EE is formed at a portion that is inside the opening in the solder resist film SR4 and that is on the surface of the wiring film TI2.

The ferroelectric film FS1 is an insulation film for making close contact with and preventing diffusion of the substrate SI and the moisture-resistant protection film PC1. In addition, the ferroelectric film FS3 is an insulation film for making close contact with the moisture-resistant protection film PC1. With regard to the electrically conductive material to be used for the capacitor electrodes PT1 and PT2, a noble metal material that has good electrical conductivity, that excels in the oxidation resistance, and that has a high melting point, such as Pt or Au, can be used.

In addition, with regard to the thin-film material to be used for the ferroelectric films FS1, FS2, and FS3, a dielectric material having a high dielectric constant is used. Specifically, a perovskite compound, such as $(Ba,Sr)TiO_3$ (BST), $SrTiO_3$, $BaTiO_3$, or $Pb(Zr,Ti)O_3$, a bismuth-layered compound, such as $SrBi_4Ti_4O_{15}$, or the like can be used.

In addition, the wiring films TI1 and TI2 are each made of three layers of Ti/Cu/Ti, in which the Ti layer is formed, for example, to 100 nm, and the Cu layer is formed, for example, to 1000 nm.

In addition, the external connection electrode EE is made of two layers of Au/Ni, in which the Ni layer serving as a first layer is formed, for example, to 2000 nm, and the Au layer serving as a second layer is formed, for example, to 200 nm.

The moisture-resistant protection film PC1 prevents the moisture discharged from the organic protection film PC2 from entering into the capacitor portion. For this moisture-resistant protection film PC1, SiNx, $SiO_2$, $Al_2O_3$, $TiO_2$, or the like can be used. In addition, the organic protection film PC2 absorbs the mechanical stress from the outside. For this organic protection film PC2, a PBO (polybenzoxazole) resin, a polyimide resin, an epoxy resin, or the like can be used.

The resistance material for the resistance film patterns RE1 and RE2 is, for example, Nichrome.

With the structure illustrated in FIGS. 11(A) and 11(B), capacitance elements (capacitance elements C11, C12, C13, C14, C15, and C16 illustrated later) connected in series with the connection electrodes 51, 52, 53, and 54 interposed therebetween are constituted.

Figure 12A:
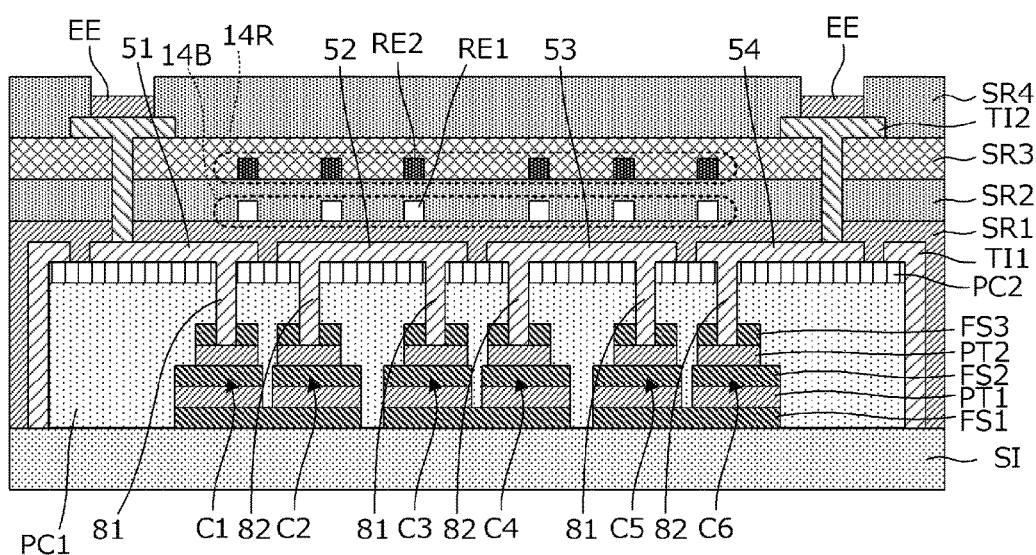
FIG. 12(A) is a sectional view of a primary portion of another capacitor 104B according to the fourth embodiment.
Figure 12B:
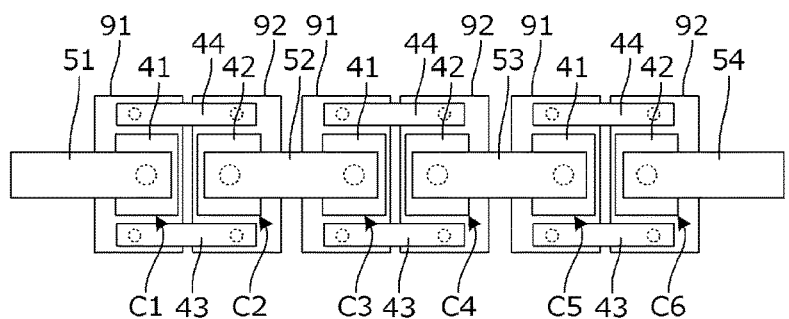
FIG. 12(B) is a fragmentary plan view of a primary portion of the capacitor 104B.

FIGS. 12(A) and 12(B) are sectional views of a primary portion of a capacitor 104B serving as a variable capacitance element. The capacitor 104B differs from the capacitor 104A illustrated in FIGS. 11(A) and 11(B) in terms of the configuration of lower electrodes. A first lower electrode 91 and a second lower electrode 92 are separated in the capacitor 104B. Other configurations are the same as those of the capacitor 104A.

Figure 13:
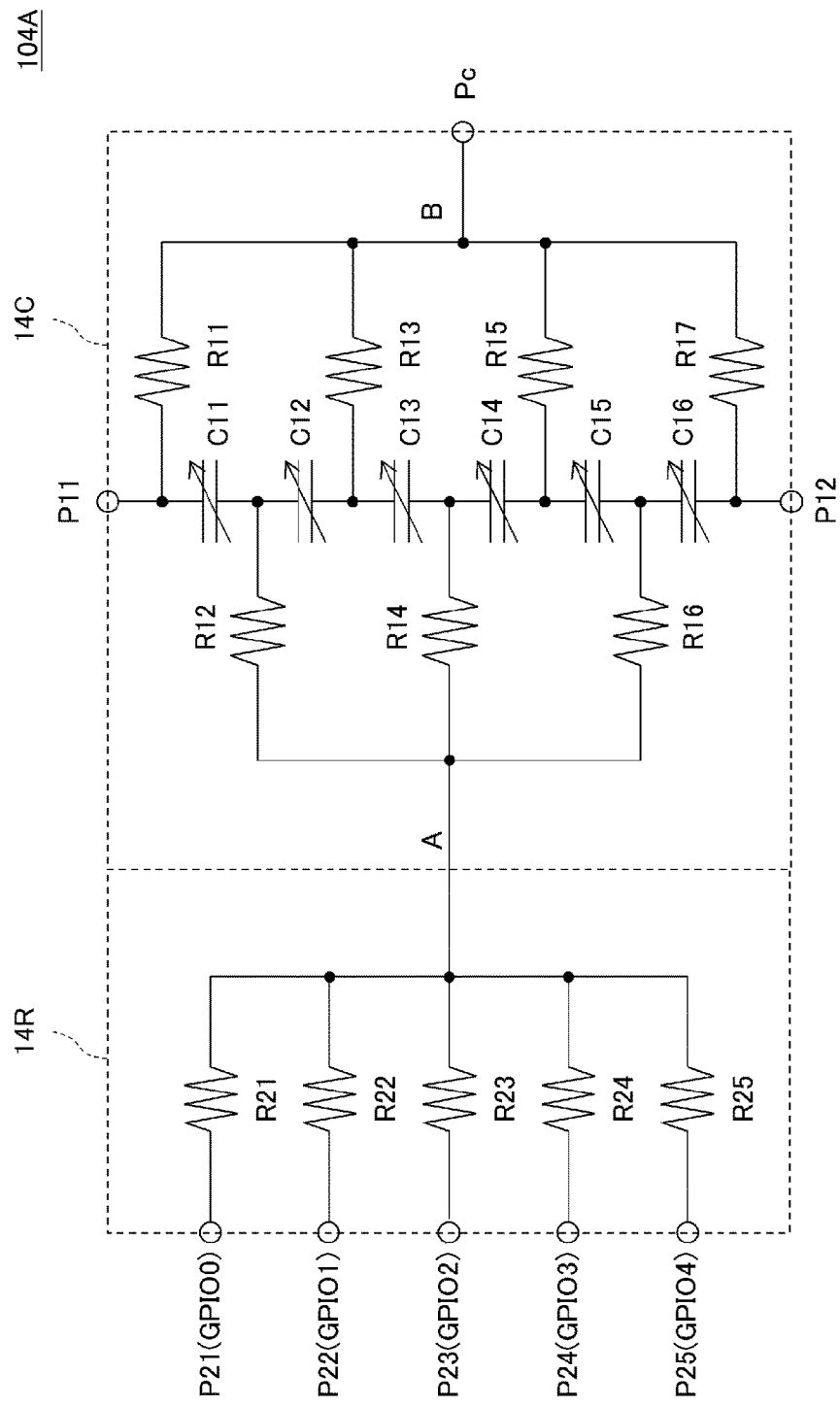
FIG. 13 is an overall circuit diagram of the inside of the capacitor 104A.

FIG. 13 is a circuit diagram of the inside of the capacitor 104A. Resistance elements R11 to R17 and R21 to R25 are resistances constituted by the resistance film patterns RE1 and RE2 described above. The capacitor 104A includes a control voltage applying circuit 14R and a variable capacitance portion 14C. In the variable capacitance portion 14C, the capacitance value between ports P11 and P12 is determined in accordance with a voltage applied across a point A and a point B. GPIO ports (GPIO0 to GPIO4) of the control circuit are connected to ports P21 to P25 of the control voltage applying circuit 14R. One ends of the resistance elements R21 to R25 are connected to the respective ports P21 to P25, and other ends of the resistance elements R21 to R25 are connected in common at the point A. For example, the ratio of the resistance values of the resistance elements R21, R22, R23, R24, and R25 is set to 1:2:4:8:16.

The ports P21 to P25 are selectively set to a high level (power-supply voltage) or to a low level (ground voltage). A port Pc of the variable capacitance portion 14C is connected to the ground. Therefore, the resistance elements R21 to R25 function as a resistive voltage divider circuit in accordance with the levels of the ports P21 to P25, and the control voltage corresponding to the voltage divider ratio and the power-supply voltage is applied across the point A and the point B of the variable capacitance portion 14C.

In the variable capacitance portion 14C, a control voltage is applied across both ends of each of the capacitance elements C11, C12, C13, C14, C15, and C16 with RF resistance elements R11 to R17 interposed therebetween. The capacitance elements C11 to C16 are each a ferroelectric capacitor in which a ferroelectric film is sandwiched by opposing electrodes. The polarization amount of the ferroelectric film changes in accordance with the intensity of an applied electric field, and the apparent dielectric constant changes. Thus, the capacitance value can be determined in accordance with the control voltage.

Although the resistance elements that constitute the control voltage applying circuit 14R are integrated in the capacitor 104A or 104B in the examples illustrated in FIGS. 11(A) and 11(B) and FIGS. 12(A) and 12(B), the resistance elements that constitute the control voltage applying circuit 14R may be provided outside the capacitor 104A or 104B. In other words, the variable capacitance portion 14C illustrated in FIG. 13 may be constituted as a single component.

«Other Embodiments»

Although the auxiliary electrodes 43 and 44 are each constituted by a single layer in each of the embodiments described above, the auxiliary electrodes 43 and 44 may be constituted by a plurality of layers. In addition, the auxiliary electrode 43 and the auxiliary electrode 44 may be formed in different layers.

Although two auxiliary electrodes 43 and 44 are provided in each of the embodiments described above, only one of them may be provided. In addition, the auxiliary electrodes 43 and 44 may be continuous within a plane and be electrically continuous.

Lastly, the descriptions of the above embodiments are illustrative in nature in all aspects and are not limiting. A person skilled in the art can made modifications and changes as appropriate. For example, a partial replacement or combination of the configurations illustrated in different embodiments can be made. The scope of the present invention is expressed not by the embodiments described above but by the claims. Furthermore, the scope of the present invention encompasses a change from the embodiments within the scope of the claims and within the scope of their equivalents.

REFERENCE SIGNS LIST

EG3, EG4 EDGE PORTION
Z1 FIRST REGION
Z2 SECOND REGION
3 INSULATION LAYER
10 SUBSTRATE
11 CLOSE CONTACT LAYER
21 FIRST DIELECTRIC LAYER
22 SECOND DIELECTRIC LAYER
30 INORGANIC INSULATION LAYER
31 FIRST ORGANIC PROTECTION LAYER
32 SECOND ORGANIC PROTECTION LAYER
33 PROTECTION LAYER
40 LOWER COMMON ELECTRODE
41 FIRST UPPER ELECTRODE
42 SECOND UPPER ELECTRODE
43, 44 AUXILIARY ELECTRODE
51 FIRST CONNECTION ELECTRODE
52 SECOND CONNECTION ELECTRODE
51V, 52V INTERLAYER CONNECTION PORTION
61 FIRST TERMINAL ELECTRODE
62 SECOND TERMINAL ELECTRODE
71A, 71B, 71C, 71D, 72A, 72B, 72C, 72D INTERLAYER CONNECTION CONDUCTOR
81, 82 INTERLAYER CONNECTION CONDUCTOR
91 FIRST LOWER ELECTRODE
92 SECOND LOWER ELECTRODE
101, 102, 103, 104A, 104B CAPACITOR
300 SEMICONDUCTOR INTEGRATED CIRCUIT
431A, 431B, 432A, 432B INTERLAYER CONNECTION PORTION
431C, 431D, 432C, 432D INTERLAYER CONNECTION PORTION

The invention claimed is:

1. A capacitor comprising:
a first lower electrode;
a second lower electrode;
a first upper electrode opposing the first lower electrode;
a first dielectric layer between the first lower electrode and the first upper electrode;
a second upper electrode opposing the second lower electrode;
a second dielectric layer between the second lower electrode and the second upper electrode;
a first connection electrode electrically connected to the first upper electrode;
a second connection electrode electrically connected to the second upper electrode and located in a first layer in which the first connection electrode is located;
an auxiliary electrode located in a second layer different from a third layer in which the first lower electrode and the second lower electrode are located and opposing the first lower electrode and the second lower electrode;
a first interlayer connection conductor interposed between and electrically connecting the first lower electrode to the auxiliary electrode; and
a second interlayer connection conductor interposed between and electrically connecting the second lower electrode to the auxiliary electrode,
wherein the auxiliary electrode is connected in parallel to the first lower electrode and the second lower electrode, and
wherein the auxiliary electrode has a sheet resistance that is lower than sheet resistances of the first lower electrode and the second lower electrode.

2. The capacitor according to claim 1, wherein a primary portion of the auxiliary electrode is located in the first layer in which, the first connection electrode and the second connection electrode are located.

3. The capacitor according to claim 1, wherein the first interlayer connection conductor includes a plurality of first portions which electrically connect the first lower electrode to the auxiliary electrode at a plurality of locations, and the second interlayer connection conductor includes a plurality of second portions which electrically connect the second lower electrode to the auxiliary electrode at a plurality of locations.

4. The capacitor according to claim 3, wherein the auxiliary electrode is connected to the first lower electrode and the second lower electrode through openings provided in the first upper electrode and the second upper electrode.

5. The capacitor according to claim 1, wherein the auxiliary electrode is connected to the first lower electrode and the second lower electrode through openings provided in the first upper electrode and the second upper electrode.

6. The capacitor according to claim 1, wherein the auxiliary electrode is disposed along outer side portions of the first connection electrode and the second connection electrode when viewed in a plan view of the capacitor.

7. The capacitor according to claim 1, further comprising:
a substrate that supports the first lower electrode, the second lower electrode, the first upper electrode, the second upper electrode, the first connection electrode, the second connection electrode, the auxiliary electrode, the first dielectric layer, and the second dielectric layer.

8. The capacitor according to claim 1, wherein the first lower electrode and the second lower electrode are configured as a continuous lower electrode.

9. The capacitor according to claim 1, wherein the first lower electrode and the second lower electrode are isolated from each other.

10. The capacitor according to claim 1, wherein the first dielectric layer and the second dielectric layer are ferroelectric layers.

11. The capacitor according to claim 1, wherein the auxiliary electrode is a first auxiliary electrode, and the capacitor further comprises:
a second auxiliary electrode located in the second layer different from the third layer in which the first lower electrode and the second lower electrode are located;

a third interlayer connection conductor interposed between and electrically connecting the first lower electrode to the second auxiliary electrode; and
a fourth interlayer connection conductor interposed between and electrically connecting the second lower electrode to the second auxiliary electrode, and
wherein the second auxiliary electrode is connected in parallel to the first lower electrode and the second lower electrode.

12. A capacitor, comprising:
a first lower electrode;
a second lower electrode;
a first upper electrode opposing the first lower electrode;
a first dielectric layer between the first lower electrode and the first upper electrode;
a second upper electrode opposing the second lower electrode;
a second dielectric layer between the second lower electrode and the second upper electrode;
a first connection electrode electrically connected to the first upper electrode;
a second connection electrode electrically connected to the second upper electrode and located in a first layer in which the first connection electrode is located;
an auxiliary electrode located in a second layer different from the first layer in which the first lower electrode and the second lower electrode are located;
a first interlayer connection conductor interposed between and electrically connecting the first lower electrode to the auxiliary electrode; and
a second interlayer connection conductor interposed between and electrically connecting the second lower electrode to the auxiliary electrode,
wherein the auxiliary electrode is connected in parallel to the first lower electrode and the second lower electrode, and
wherein the first lower electrode and the second lower electrode comprise a metal containing Pt as a primary component thereof, and the first connection electrode, the second connection electrode, and the auxiliary electrode comprise a metal containing Cu or Al as a primary component thereof.

13. A capacitor, comprising:
a first lower electrode;
a second lower electrode;
a first upper electrode opposing the first lower electrode;
a first dielectric layer between the first lower electrode and the first upper electrode;
a second upper electrode opposing the second lower electrode;
a second dielectric layer between the second lower electrode and the second upper electrode;
a first connection electrode electrically connected to the first upper electrode;
a second connection electrode electrically connected to the second upper electrode and located in a first layer in which the first connection electrode is located;
an auxiliary electrode located in a second layer different from the first layer in which the first lower electrode and the second lower electrode are located;
a first interlayer connection conductor interposed between and electrically connecting the first lower electrode to the auxiliary electrode;
a second interlayer connection conductor interposed between and electrically connecting the second lower electrode to the auxiliary electrode; and
a substrate that supports the first lower electrode, the second lower electrode, the first upper electrode, the second upper electrode, the first connection electrode, the second connection electrode, the auxiliary electrode, the first dielectric layer, and the second dielectric layer,
wherein the auxiliary electrode is connected in parallel to the first lower electrode and the second lower electrode, and
wherein the first lower electrode and the second lower electrode comprise a metal containing Pt as a primary component thereof, and the first connection electrode, the second connection electrode, and the auxiliary electrode comprise a metal containing Cu or Al as a primary component thereof.

14. A capacitor comprising:
a first lower electrode;
a second lower electrode;
a first upper electrode opposing the first lower electrode;
a first dielectric layer between the first lower electrode and the first upper electrode;
a second upper electrode opposing the second lower electrode;
a second dielectric layer between the second lower electrode and the second upper electrode;
a first connection electrode electrically connected to the first upper electrode;
a second connection electrode electrically connected to the second upper electrode and located in a first layer in which the first connection electrode is located;
an auxiliary electrode located in a second layer different from a third layer in which the first lower electrode and the second lower electrode are located and opposing the first lower electrode and the second lower electrode;
a first interlayer connection conductor interposed between and electrically connecting the first lower electrode to the auxiliary electrode;
a second interlayer connection conductor interposed between and electrically connecting the second lower electrode to the auxiliary electrode; and
a control voltage applying circuit that includes a plurality of resistance elements having different resistance values, the control voltage applying circuit being configured to apply a control voltage having a plurality of varying patterns across the first lower electrode and the first upper electrode and across the second lower electrode and the second upper electrode,
wherein the auxiliary electrode is connected in parallel to the first lower electrode and the second lower electrode, and
wherein the first dielectric layer and the second dielectric layer are ferroelectric layers.

15. A capacitor comprising:
a first lower electrode;
a second lower electrode;
a first upper electrode opposing the first lower electrode;
a first dielectric layer between the first lower electrode and the first upper electrode;
a second upper electrode opposing the second lower electrode;
a second dielectric layer between the second lower electrode and the second upper electrode;
a first connection electrode electrically connected to the first upper electrode;
a second connection electrode electrically connected to the second upper electrode and located in a first layer in which the first connection electrode is located;

a first auxiliary electrode located in a second layer different from a third layer in which the first lower electrode and the second lower electrode are located and opposing the first lower electrode and the second lower electrode;

a first interlayer connection conductor interposed between and electrically connecting the first lower electrode to the first auxiliary electrode;

a second interlayer connection conductor interposed between and electrically connecting the second lower electrode to the first auxiliary electrode;

a second auxiliary electrode located in the second layer different from the third layer in which the first lower electrode and the second lower electrode are located;

a third interlayer connection conductor interposed between and electrically connecting the first lower electrode to the second auxiliary electrode; and a fourth interlayer connection conductor interposed between and electrically connecting the second lower electrode to the second auxiliary electrode, wherein the first auxiliary electrode is connected in parallel to the first lower electrode and the second lower electrode, wherein the second auxiliary electrode is connected in parallel to the first lower electrode and the second lower electrode, and wherein the first and second auxiliary electrodes each have a sheet resistance that is lower than sheet resistances of the first lower electrode and the second lower electrode.

16. The capacitor according to claim 15, wherein a first primary portion of the first auxiliary electrode is located in the first layer, a second primary portion of the second auxiliary electrode is located in the first layer, and the first connection electrode, the second connection electrode, the third interlayer connection conductor, and the fourth interlayer connection conductor are located in the second layer.

17. The capacitor according to claim 15, wherein the first interlayer connection conductor includes a plurality of first portions which electrically connect the first lower electrode to the first auxiliary electrode at a plurality of locations, the second interlayer connection conductor includes a plurality of second portions which electrically connect the second lower electrode to the first auxiliary electrode at a plurality of locations, the third interlayer connection conductor includes a plurality of third portions which electrically connect the first lower electrode to the second auxiliary electrode at a plurality of locations, the fourth interlayer connection conductor includes a plurality of fourth portions which electrically connect the second lower electrode to the second auxiliary electrode at a plurality of locations.

18. The capacitor according to claim 17, wherein the first auxiliary electrode is connected to the first lower electrode and the second lower electrode through first openings provided in the first upper electrode and the second upper electrode, and the second auxiliary electrode is connected to the first lower electrode and the second lower electrode through second openings provided in the first upper electrode and the second upper electrode.

19. The capacitor according to claim 15, wherein the first auxiliary electrode is connected to the first lower electrode and the second lower electrode through first openings provided in the first upper electrode and the second upper electrode, and the second auxiliary electrode is connected to the first lower electrode and the second lower electrode through second openings provided in the first upper electrode and the second upper electrode.

* * * * *